United States Patent Office 2,991,272
Patented July 4, 1961

2,991,272
2-ALKYL-4,5-DIMETHYLPHENOLS AS DETERIORATION RETARDERS FOR RUBBERS
Roger E. Morris, Cuyahoga Falls, Ohio, assignor to The B. F. Goodrich Company, New York, N.Y., a corporation of New York
No Drawing. Filed June 12, 1957, Ser. No. 665,112
9 Claims. (Cl. 260—45.95)

This invention relates to deterioration retarders for rubber and to rubber compositions embodying such deterioration retarders, and more particularly to deterioration retarders which impart to rubber compositions very high flex-cracking resistance as well as highly efficient age-resisting properties, and at the same time are to a high degree non-staining and non-discoloring when used in light-colored and white rubber compositions and also when used in black rubber compositions, such as an automobile tire, which are vulcanized in contact with white or light-colored surface layers of rubber, such as the white side walls of automobile tires.

It is recognized that the properties of the vulcanized rubber compositions of which automobile tires are made should have very high resistance to flex-cracking, since the rotation of the tire on the road causes a considerable degree of continuous and rapidly repeated flexing of the rubber compositions of the tire, with the inevitable result that the rubber compositions in time develop cracks which grow with use of the tire to a point where tire failure may result.

It is also well known that vulcanized rubber compositions deteriorate with age and use, due to the action of circumambient media, the rate of deterioration being dependent upon the oxygen and azone content of the atmosphere and upon the presence and amount of sunlight, to which the rubber compositions are exposed, as well as the temperature of, and tension imposed upon, the rubber compositions during useful life.

It has previously been the practice to embody in rubber compositions before vulcanization antioxidants of the diarylamine type. These antioxidants, while effective as flex-cracking retarders and as age-resisters, have the property of staining and discoloring rubber compositions, particularly on exposure to sunlight, and hence are not suitable for the rubber compositions used in the manufacture of white side-wall tires, even in the carbon black rubber compositions of the tire body. Where the carbon black rubber compositions of the tire carcass contain diarylamine antioxidants, all of which have staining and discoloring properties to a greater or less extent, the staining antioxidant migrates slowly from the rubber composition of the carcass into the white side-wall stock and in time effects a permanent and unattractive staining and discoloration of the white side walls.

Heretofore, various non-staining and non-discoloring deterioration retarders have been used in rubber compositions to overcome the above mentioned undesirable properties, and, while they do not cause serious staining or discoloration, they are relatively weak in imparting flex-cracking resistance and aging resistance to rubber compositions, and hence are unsatisfactory in the rubber compositions of the automobile tire, and like rubber products.

There is consequently a need for better deterioration retarders for rubber compositions, since no one of the presently available deterioration retarders has all three of the above mentioned desirable properties, namely, high resistance to flex-cracking, high resistance to aging deterioration, and non-staining, non-discoloring properties, in a satisfactorily high degree of efficiency to produce the superior quality rubber products required to meet present-day standards.

It is to a class of deterioration retarders having all these desirable properties, and particularly that of imparting very high flex-cracking resistance, while at the same time having non-staining and non-discoloring properties that this application is directed.

The term "rubbery diolefin polymer" is employed in this application in a broad generic sense to include all natural and synthetic rubbery diolefin polymers, whether or not admixed with fillers, pigments, vulcanizing and/or accelerating agent and the like, examples of such rubbery diolefin polymers including the various natural crude rubbers, which are regarded as naturally-occurring isoprene polymers, and such synthetic rubbers as polymers of conjugated dienes, such as butadiene-1,3, isoprene, 2-methyl butadiene-1,3, and other butadiene-1,3 hydrocarbons, chloroprene, cyano butadiene-1,3, etc., as well as copolymers of these conjugated dienes with each other or with other unsaturated compounds copolymerizable therewith, such as styrene, chlorostyrene, isobutylene, acrylonitrile, methacrylonitrile, acrylic and methacrylic acids, alkyl acrylates and methacrylates, vinylidene chloride, vinyl pyridine, etc.

I have discovered that a class of chemical compounds produced by the reaction of 4,5-dimethylphenol with certain olefins impart to a vulcanized rubber composition when incorporated therein generally superior properties, notably unusually high flex-cracking resistance, as well as good aging resistance and non-staining, non-discoloring properties. This class of chemical compounds is herein generically referred to as the 2-hydrocarbon-4,5-dimethylphenols.

The olefins which yield the most effective deterioration retarders, namely, deterioration retarders having very high flex-cracking resistance, are the alpha-olefins, having 4 or more carbon atoms, including aliphatic, alicyclic and aromatic hydrocarbon radicals, such as butene-1, isobutylene, pentene-1, hexene-1, heptene-1, octene-1, and higher homologues.

In carrying out the above indicated reaction, an acidic condensation catalyst is preferably employed, such as sulfuric acid, para-toluene sulfonic acid, acid activated clays and others. Particularly effective are finely divided acid activated clays, since they are readily removed from the end reaction mixture by filtration and carry with them impurities and undesirable reaction products. The acid activated clays preferred are those whose major component is aluminum silicate in an amount preferably greater than 50 percent, have such a particle size that greater than 90 percent of the particles pass through a 325 mesh screen and have an average particle size less than 0.05 millimeter; and are treated with an acid having a pH between 1 and 6. Of these, the acid actviated clay marketed as Retrol is an example. The amount of acid activated clay catalyst employed is not critical and may vary from 0.1 to 10 or more weight percent of the reactants, and generally from about 0.5 to 5 weight percent have been found to be satisfactory.

The deterioration retarders of this application can be readily admixed with rubber and rubber compositions at any stage prior to vulcanization. For example, they may be admixed into rubber and rubber compositions at the same time and in the same manner that vulcanizing, accelerating and other compounding ingredients are added, which is a preferred way for incorporating the deterioration retarders into natural crude rubber and results in the deterioration retarders being uniformly dispersed throughout the rubber composition. In the case of synthetic rubbers, which are ordinarily prepared by polymerization in an aqueous medium, it may be advantageous to add the deterioration retarders in an aqueous dispersion or emulsion to the synthetic rubber latex as it comes from the polymerizer. In this way, when the synthetic rubber is recovered from the latex by coagulation, the deterioration retarder is already uniformly distributed throughout the mass of the synthetic rubber, so that the rubber is protected against deterioration from the time it is made until it is compounded for use. This makes it unnecessary to add the deterioration retarder during the compounding of the rubber, although more of the deterioration retarder can be added with the other compounding ingredients in the event any specific rubber composition may indicate such a course to be desirable.

The amount of the deterioration retarder which may be employed in rubber and rubber compositions ranges from about 0.1 to about 10 weight percent based on the rubber, whereas to obtain a maximum value of the deterioration retarders of this application as very highly efficient flex-cracking age-resisters, an amount ranging from about 0.5 to about 5 weight percent on the rubber will normally give adequate protection, although for most uses in rubber compounding one weight percent of the deterioration retarder on the rubber may be satisfactorily employed.

The following examples are to be understood to be illustrative only since numerous modifications and variations will be apparent to those skilled in the art.

EXAMPLE I

Into a three-necked round bottom reactor equipped with a stirrer, a gas inlet tube leading to the bottom of the reactor, a dropping funnel, a reflux condensor and a heating mantle, are charged 250 g. (2 mols) of 4,5-dimethylphenol, 300 milliliters of benzene and 20 g. of sulfuric acid activated clay, of the character hereinabove referred to. The mixture is warmed to 60° C. and rapid stirring is maintained while isobutylene is passed through the gas inlet tube into the reactor contents as rapidly as possible without loss of isobutylene through the condensor. The reaction is continued with stirring at a temperature ranging from 70° to 80° C. for one hour after the rate of isobutylene uptake has become slow. The reactor contents are allowed to cool. The catalyst is removed by filtration. After concentration of the filtrate, the reaction product is distilled under reduced pressure to yield 2-t-butyl-4,5-dimethylphenol.

*Evaluation of properties of product of Example I*

The reaction product of Example I, namely, 2-t-butyl-4,5-dimethylphenol, was evaluated for its efficiency as a flex-cracking age-resister and an antioxidant for rubber by incorporating it into a standard natural rubber recipe and curing in a steam press. The recipe employed was:

| Ingredients: | Parts by weight |
|---|---|
| Natural rubber | 100.0 |
| Channel black (EP) | 50.0 |
| Zinc oxide | 5.0 |
| Stearic acid | 3.0 |
| Sulfur | 3.0 |
| Accelerator (benzothiazyl disulfide) | 1.0 |
| Reaction product of Example I | 1.0 |

A control without the deterioration retarder, but otherwise the same as in the above recipe, and a compound having 1 part of phenyl b-naphthylamine replacing the 1 part of the reaction product of Example I, were also compounded and vulcanized for comparison purposes. Each of the compounded stocks was cured in a steam press at 280° F. for 60 and 80 minutes.

The aging tests followed the standard ASTM procedure (D865-48T). Test dumbbell strips were cut from the vulcanized stock and aged in open test tubes for 24 and 48 hours at 212° F. Flexing tests were made in a De Mattia Flexing Machine which records the number of flexures. The following test results were obtained:

TABLE I—TENSILE AND FLEX-LIFE OF REACTION PRODUCT OF EXAMPLE I

| | Percentage of Original Tensile Strength Retained After Aging— 212° F. | | | | Flex-Life to Failure | Flex-Life Improvement Over Blank |
|---|---|---|---|---|---|---|
| | 24 Hours' Aging | | 48 Hours' Aging | | | |
| | 60" Cure | 80" Cure | 60" Cure | 80" Cure | | |
| Reaction Product—Example I | 92 | 81 | 78 | 67 | 338,000 | 10.5 |
| Control—No Antioxidant | 55 | 42 | 30 | 26 | 32,000 | 1.0 |
| Standard—phenyl b-naphthylamine | 83 | 80 | 69 | 60 | 263,000 | 8.2 |

The results in the above Table I show that the flex-resisting properties of the vulcanized rubber composition containing the reaction product of Example I, namely, 2-t-butyl-4,5-dimethylphenol, are vastly superior to the vulcanized rubber composition having no antioxidant and are decidedly superior to those of phenyl b-naphthylamine, the presently most widely used antioxidant, and hence may be substituted for phenyl b-naphthylamine in any rubber or rubber composition, including rubber compositions of pneumatic tires.

*Evaluation of staining and discoloration*

The reaction product of Example I was tested for staining and discoloration tendencies by incorporating in a standard white side-wall rubber stock and curing in a steam press. The recipe employed was:

| Ingredients: | Parts by weight |
|---|---|
| Natural rubber | 100.0 |
| Zinc oxide | 85.0 |
| Titanium dioxide | 15.0 |
| Ultramarine blue | 0.2 |
| Stearic acid | 1.0 |
| Accelerator (heptane base) | 0.3 |
| Sulfur | 3.0 |
| Reaction product of Example I | 1.0 |

For comparison, a control stock without antioxidant, and another stock containing AgeRite White (sym. di-beta-naphthyl-p-phenylenediamine), one of the presently most widely used non-staining antioxidants, were similarly compounded and given a like cure. The cured stocks were exposed to a standard RS sunlamp at a distance of 8 inches for 24 hours (ASTM procedure) to determine the discoloration of the stock when exposed to light. The reaction product of Example I was tested for staining by taking vulcanized test pieces of cured white rubber stock, identified above, and placing them between white lacquered and white enameled refrigerator panels for 96 hours at 80° C. at a constant pressure of one pound per square inch.

In the table below, the greater the numerical value, the greater the staining and discoloration; the lower the numerical value, the better the quality.

TABLE II

*Staining and discoloration of reaction product of Example I*

| Deterioration Retarder | Staining | Discoloration |
|---|---|---|
| Reaction Product—Example I | 0.2 | 4 |
| Control—None | 0.2 | 2 |
| Standard—AgeRite White | 4.0 | 8 |

The above tests showed that white rubber stocks containing the reaction product of Example I do not stain more than the same stock without an antioxidant and are far superior in staining properties to the standard non-staining antioxidant, sym. di-beta-naphthyl-p-phenylenediamine, (AgeRite White). Further, the discoloration properties of the reaction product of Example I are much superior to the presently standard non-staining antioxidant, AgeRite White.

EXAMPLE II

Utilizing the same equipment as in Example I, 122 g. (1 mol) of 4,5-dimethylphenol, 200 milliliters of glacial acetic acid and 10 milliliters of $H_2SO_4$ are heated with stirring to 70° C. and then 112 g. (1 mol) of diisobutylene is added dropwise to the reactor contents with stirring over a period of about one hour. Heating and stirring is continued for about 4½ hours, the reactor contents being maintained at about 65° to 80° C. The reactor contents are cooled and then poured slowly into 500 milliliters of water with stirring. Upon standing, reactor contents separated into two layers. The organic layer is diluted with benzene and washed twice with water, then once with saturated $Na_2CO_3$ solution and once again with water. After drying over anhydrous $K_2CO_3$, the benzene is removed by distillation, and the 2-octyl-4,5-dimethylphenol is isolated by fractional distillation under vacuum. The end product is a solid melting at 85–90° C. and analysis shows it to be 2-octyl-4,5-dimethylphenol in which the octyl radical is a diisobutyl radical.

The product of Example II also shows on test an unusually high rating in flex-cracking resistance, which is the outstanding property of the 2-hydrocarbon-4,5-dimethyphenols of this invention.

Rubber vulcanizates embodying deterioration retarders of this invention have outstanding properties notably in flex-cracking resistance, as well as in aging resistance, and in non-staining, non-discoloring properties, characteristics which are desirable in any rubber product but which are highly important in white and light-colored rubber products such as white side-wall tires.

It is to be understood that the invention of this application is not limited to the specific disclosures herein set forth, which have been presented as illustrations, since modifications in the proportions and types of materials employed may be varied and equivalent materials may be employed, where desirable, without departing from the spirit and scope of the invention as defined in the appended claims.

What is claimed is:

1. A vulcanized rubbery diolefin polymer product having outstanding flex-cracking resistance, excellent antioxidant properties and good non-staining, non-discoloring properties, in which is incorporated before vulcanization as a deterioration retarder a 2-alkyl-4,5-dimethylphenol in which the alkyl radical is selected from the class consisting of t-butyl and diisobutyl radicals.

2. A vulcanized rubbery diolefin polymer product in which is incorporated before vulcanization as a deterioration retarder a 2-alkyl-4,5-dimethylphenol in which the alkyl radical is a diisobutyl radical.

3. A vulcanized rubbery diolefin polymer product in which is incorporated before vulcanization as a deterioration retarder a 2-alkyl-4,5-dimethylphenol in which the alkyl radical is a t-butyl radical.

4. A rubbery diolefin polymer composition having when vulcanized outstanding flex-cracking resistance, excellent antioxidant properties and good non-staining, non-discoloring properties, in which composition is incorporated before vulcanization as a deterioration retarder from about 0.1 to about 10.0 parts by weight of a 2-alkyl-4,5-dimethylphenol in which the alkyl radical is selected from the class consisting of t-butyl and diisobutyl radicals.

5. A rubbery diolefin polymer composition having when vulcanized outstanding flex-cracking resistance, excellent anti-oxidant properties and good non-staining, non-discoloring properties, in which composition is incorporated before vulcanization as a deterioration retarder from about 0.1 to about 10.0 parts by weight of a 2-alkyl-4,5-dimethylphenol in which the alkyl radical is a diisobutyl radical.

6. A rubbery diolefin polymer composition having when vulcanized outstanding flex-cracking resistance, excellent anti-oxidant properties and good non-staining, non-discoloring properties, in which composition is incorporated before vulcanization as a deterioration retarder from about 0.1 to about 10.0 parts by weight of a 2-alkyl-4,5-dimethylphenol in which the alkyl radical is a t-butyl radical.

7. The method of producing a sulfur-vulcanized rubbery diolefin polymer product having outstanding flex-cracking resistance, excellent antioxidant properties and good non-staining, non-discoloring properties, which comprises sulfur vulcanizing a vulcanizable rubbery diolefin polymer composition containing for each 100 parts of the said polymer from about 0.1 to about 5.0 parts by weight of a 2-alkyl-4,5-dimethylphenol in which the alkyl radical is selected from the class consisting of t-butyl and diisobutyl radicals.

8. The method of producing a sulfur-vulcanized rubbery diolefin polymer product having outstanding flex-cracking resistance, excellent antioxidant properties and good non-staining, non-discoloring properties, which comprises sulfur vulcanizing a vulcanizable rubbery diolefin polymer composition containing for each 100 parts of the said polymer from about 0.1 to about 5.0 parts by weight of a 2-alkyl-4,5-dimethylphenol in which the alkyl radical is a diisobutyl radical.

9. The method of producing a sulfur-vulcanized rubbery diolefin polymer product having outstanding flex-cracking resistance, excellent antioxidant properties and good non-staining, non-discoloring properties, which comprises sulfur vulcanizing a vulcanizable rubbery diolefin polymer composition containing for each 100 parts of the said polymer from about 0.1 to about 5.0 parts by weight of a 2-alkyl-4,5-dimethylphenol in which the alkyl radical is a t-butyl radical.

References Cited in the file of this patent

UNITED STATES PATENTS

| | | |
|---|---|---|
| 2,356,929 | Hart | Aug. 29, 1944 |
| 2,581,907 | Smith et al. | Jan. 8, 1952 |
| 2,900,362 | Spacht | Aug. 18, 1959 |

FOREIGN PATENTS

| | | |
|---|---|---|
| 522,011 | Canada | Feb. 21, 1956 |